United States Patent
Shek et al.

(10) Patent No.: US 6,919,807 B2
(45) Date of Patent: Jul. 19, 2005

(54) METHOD AND SYSTEM FOR COLLABORATIVE AND FAIL-TOLERANT DEPLOYMENT OF AUTOMATIC IDENTIFICATION AND DATA COLLECTION (AIDC) DEVICES

(75) Inventors: Eddie C. Shek, Sherman Oaks, CA (US); Greg Kaestle, Long Beach, CA (US)

(73) Assignee: Vizional Technologies, Inc., El Segundo, CA (US)

( * ) Notice: Subject to any disclaimer, the term of this patent is extended or adjusted under 35 U.S.C. 154(b) by 6 days.

(21) Appl. No.: 10/360,885

(22) Filed: Feb. 7, 2003

(65) Prior Publication Data

US 2004/0155778 A1 Aug. 12, 2004

(51) Int. Cl.[7] ............................................... G08B 13/14
(52) U.S. Cl. ............................... 340/572.1; 340/572.4; 340/568.1; 340/539.13; 340/539.19
(58) Field of Search ......................... 340/572.1, 572.4, 340/568.1, 539.13, 539.19; 235/376, 377, 384, 385, 487, 488; 705/7, 8, 22, 9, 28

(56) References Cited

U.S. PATENT DOCUMENTS

| | | | | |
|---|---|---|---|---|
| 4,827,395 A | * | 5/1989 | Anders et al. ................. 700/9 |
| 5,151,684 A | * | 9/1992 | Johnsen .................... 340/568.1 |
| 6,025,780 A | * | 2/2000 | Bowers et al. ........... 340/572.3 |
| 6,195,006 B1 | * | 2/2001 | Bowers et al. ........... 340/572.1 |

* cited by examiner

Primary Examiner—Hung Nguyen
(74) Attorney, Agent, or Firm—Kenyon & Kenyon

(57) ABSTRACT

Data is stored on a tag unit. The tag unit provides for alert monitoring capabilities and monitoring of events, these capabilities allow for supply chain plans to be restructured and for events to be rescheduled. The tag unit is attached to an item for tracking purposes. The tag unit monitors and stores a status of the item. Then the item is sent to a destination. The tag unit is scanned when the item has been sent to a destination. The data on the tag unit is updated as a function of scanning. The data is updated when the tag unit is scanned at a destination. Then the data on the tag unit is validated. The data is validated for security purposes. The data on the tag unit is scanned to identify conditions to trigger actions. The system recovers from failure to read data on the tag unit by reconstructing the expected data from a history of the tag unit. Failure may be a result of identified or unidentified tempering of tag units, failure of the tag unit mechanism, or violation of the tag unit access limitations.

16 Claims, 2 Drawing Sheets

METHOD AND SYSTEM FOR COLLABORATIVE AND FAIL-TOLERANT DEPLOYMENT OF AUTOMATIC IDENTIFICATION AND DATA COLLECTION (AIDC) DEVICES

FIELD OF THE INVENTION

The present invention relates to a system and method for collaborative and fail-tolerant deployment of automatic identification and data collection (AIDC) devices.

BACKGROUND INFORMATION

Pervasive and secure real-time supply chain situation awareness (i.e., where things are and when activities happen) maximizes the value of supply chain event response and adaptive supply chain management solutions.

Automatic identification and data collection (AIDC) systems may be used to track and identify items in batch or real-time. AIDC systems may allow for data collection through passive and active approaches. Passive approaches include bar codes and magnetic strips. Active approaches include global positioning systems (GPS) and real-time location systems (RTLS). Radio-frequency identification tag (RFID) systems may be active and/or passive.

RFID tags may be small tags that may be placed on containers, pallets, or even individual items. The ubiquity of RFID tags may allow for measurement of supply chain effectiveness to a very fine degree. RFID tags may allow for enhanced security and the ability to securely track and verify shipments.

Users of AIDC technologies have chosen a variety of different but complementary forms of AIDC to identify and collect data on items everywhere. Users have done this in an attempt to incorporate legacy systems into their AIDC efforts and to implement AIDC systems that are flexible and are not locked into a particular AIDC hardware platform. While the varying AIDC technologies are complementary in theory, in actual practice it may be incredibly difficult and costly to make such AIDC systems work seamlessly together.

It is an object of the method and system of the present invention to provide for a standard manner in which to deal with the myriad of devices and protocols that fall under AIDC technologies.

SUMMARY OF THE INVENTION

The method and system of the present invention may allow for users to implement any AIDC technology without regard for hardware specifics. This may allow for use of heterogeneous AIDC devices and for collections of AIDC devices to be treated as a reliable distributed database. Data is stored on a tag unit that may be read-only or writeable. The data may include an unique identifier of the of the tag unit, the type of tag, the profile of the tag, time of scanning the tag and status of scanning of tag. The data may also include application-specific information such as destination data, weight of item data, and bill of lading data when used in an item tracking application. The tag unit is attached to an item or some other type of container for tracking purposes. The item may be part of some type of supply chain. The item may include at least one article for shipment. The tag unit provides for alert monitoring capabilities and monitoring of events, these capabilities may allow for supply chain plans to be restructured and for events to be rescheduled. The tag unit monitors and stores a status of the item. Then the item is sent to a destination. The tag unit is scanned when the item has been sent to a destination. On course to a final destination, the item may be sent to various destinations for processing. The data on the tag unit may be updated as a function of scanning. The data on the tag unit is scanned to identify conditions to trigger actions, i.e., actions relations to operating a supply chain. The system recovers from failure to read data on the tag unit by reconstructing the expected data from a history of the tag unit. Failure may be a result of identified or unidentified tempering of tag units, failure of the tag unit mechanism, or violation of the tag unit access limitations. The data is updated when the tag unit has arrived at a destination. Then the data on the tag unit is validated. The data is validated for security purposes.

DETAILED DESCRIPTION

The method and system of the present invention provide for a standard manner in which to deal with the myriad of devices and protocols that fall under AIDC technologies. The method and system of the present invention may allow for users to implement any AIDC technology without regard for hardware specifics. This may allow for use of heterogeneous AIDC devices and for collections of AIDC devices to be treated as a reliable distributed database.

Asset and inventory tagging technologies that support data update, location identification in wide area (of different granularity), and environmental sensing (e.g., temperature) may be used in total adaptive real-time supply chain interaction and execution. Such asset and inventory tagging technologies may enable pervasive visibility and synchronization to the "edge" of supply chains. Radio-Frequency Identification (RFID) is one popular example of Automatic Identification and Data Collection (AIDC) technology that supports asset and inventory tagging.

One of the major deterrents to large-scale deployment of RFID asset tagging today is the lack of infrastructure support to manage the significantly increased information volume and allow efficient application development.

Figure 1:
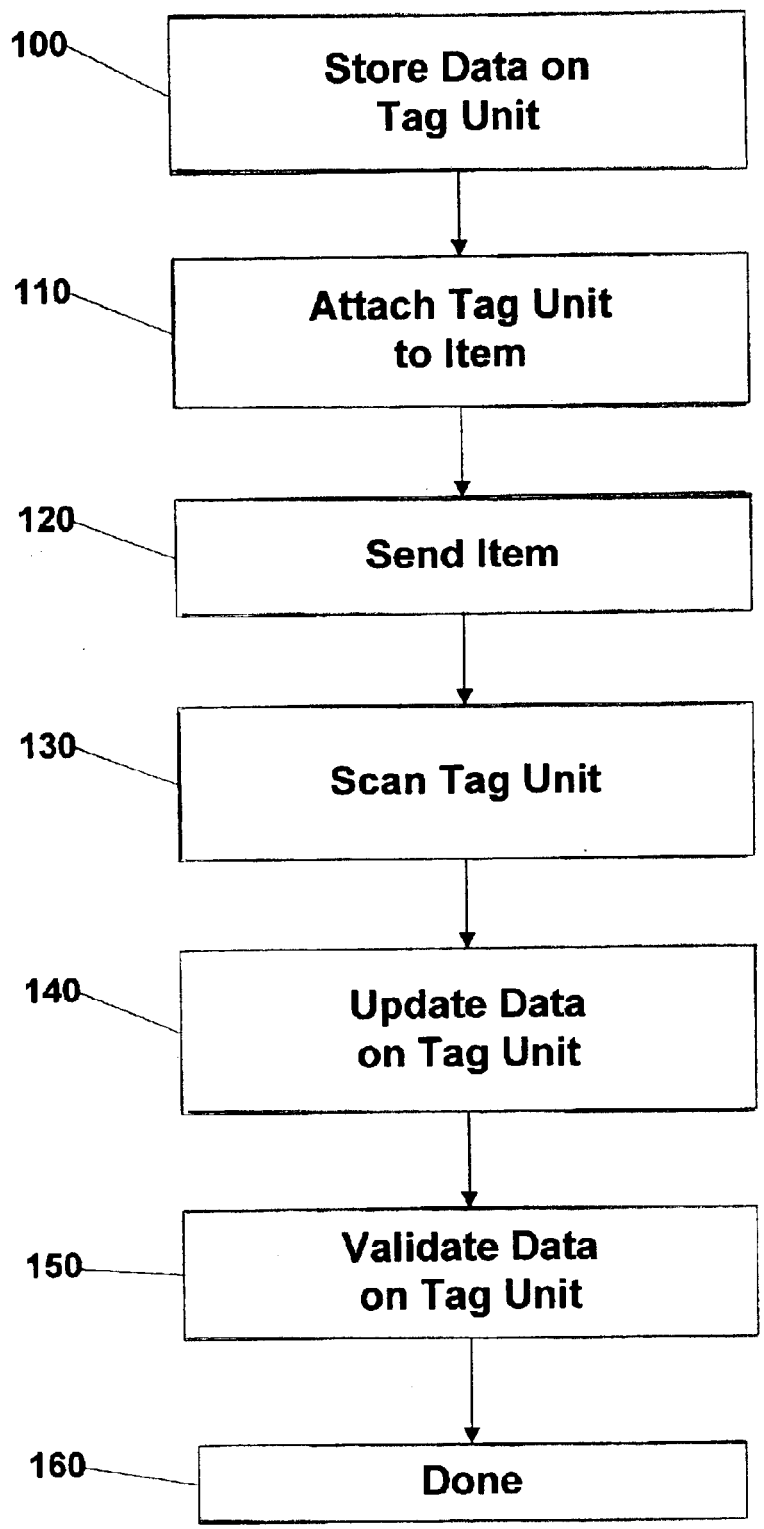
FIG. 1 shows an exemplary method according to the present invention.

FIG. 1 shows an exemplary method according to the present invention. The method provides for tracking items. The items may be part of some type of supply chain. In step 100, data is stored on a tag unit that is readable and/or writeable. The data may include an unique identifier of the of the tag unit, the type of tag, the profile of the tag, time of scanning the tag and status of scanning of tag. The data may also include tracking information such as destination data, weight of item data, and bill of lading data. The tag unit may conform to the Radio-Frequency Identification (RFID) standard and provides for alert monitoring capabilities and monitoring of events, these capabilities may allow for supply chain plans to be restructured and for events to be rescheduled. Additionally, the tag units may be configured for environmental sensing (e.g., temperature), shock/vibration sensing, item weight sensing and other sensing. The tag unit may be in communication with a locationing system, e.g., a GPS system or triangulation system, to provide location data of the tag unit and items in a supply chain.

In an exemplary embodiment of the present invention, Java-based distributed agents (software applications capable of running on various hardware platforms), known as edge interaction agents are associated to the tag units. An edge interaction agent host drivers to RFID tag readers and provide authenticated access to data on tag units. "Edge" refers to (1) edge of information system (or "information edge interaction") and (2) edge of domain of supply chain control (or enterprise edge interaction). Information edge interaction is "where the bits hit the atoms". Information edge interaction is a reflection of close to real-life situation as in the asset tagging and tracking scenario; knowing where things are and what state they are in at all times maximizes visibility. Enterprise edge interaction details "where material, asset, money change hands" and is reflection on changes and interactions on the edge of enterprise domain as in the case of real-time proof-of-delivery as material changes hand. Knowing immediately when information and physical assets "changed hands" (through use of wireless Palm Pilots, etc.) maximizes response agility.

This exemplary embodiment may function as an "operating system" for heterogeneous AIDC devices that allows collections of AIDC devices to be treated by software applications as a reliable distributed database, and hides that the fact that AIDC devices are memory buffers that are unreliable, due to fact that AIDC devices may not always be in range of the reader/interrogator, often has unknown location, since the devices may be associated with objects that move, and are insecure and easily tempered with.

In step 110, the tag unit is attached to an item for tracking purposes. The item may be part of some type of supply chain. The item may include at least one article for shipment. The tag unit monitors and stores a status of the item.

In step 120, the item is sent to a destination.

In step 130, the tag unit is scanned when the item has arrived at a destination. On course to a final destination, the item may be sent to various destinations for processing.

In step 140, the data on the tag unit is updated as a function of scanning. The data is updated when the tag unit is scanned at a destination. For example, the scan time and the scan status may be updated.

In step 150, the data on the tag is validated. The data is validated for security purposes. The data on the tag unit is scanned to identify conditions to trigger actions, i.e., actions relations to operating a supply chain. The system recovers from failure to read data on the tag unit by reconstructing the expected data from a history of the tag unit. Failure may be a result of identified or unidentified tempering of tag units, failure of the tag unit mechanism, or violation of the tag unit access limitations. In the exemplary embodiment, the edge interaction agents may be capable of recovering from tempering and loss of tag information during the supply chain life cycle. The edge interaction agents provide authenticated access to tag/device information. The agents may optionally encrypt data written to AIDC devices to prevent unauthorized reads. More importantly, agents also provide failure and disconnected operation support. When write to a tag fails, the agent queries other peer agents of the failure so that all appropriate agents are aware of the failure so that the next time they see the tag they may perform the write or issue a warning. At the same time, the agent may recover from the failure by querying for the last known content of the tag based on built-in unique tag identification from peer agents and rewrite the content to the tag either automatically or after asking for user validation. Similarly, read access to tags may be verified through encryption/decryption or by another mechanism such as check-summing. If the verification fails, an agent may query peer agents (or itself) for last known value of the content of the tag and trigger an alert notifying relevant users of the failure.

In step 160, the method is complete.

According to the present invention, a set of tag units forms a database for tracking items. In order for the method and system of the present invention to provide a higher degree of reliability, a wider range, faster speed for tracking capabilities and to provide a higher degree of security for the tag units, a peer-to-peer architecture is utilized rather than a hierarchical architecture. The peer-to-peer architecture of system does not require a centralized storage mechanism. The set of tag units may act as a storage mechanism. The method and system of the present invention treat the set of tag units as a database that does not require network connectivity. It is not necessary to have constant connectivity to consider the tag units an extension of a database. A computer database may be the backup system for the set of tag units.

In the exemplary embodiment, edge interaction agents form a peer-to-peer network of computing nodes that perform information processing and event monitoring to filter the flood of signals from the many devices/tags being monitored and recognized. Local decision by "behavior" may be encoded onto a tag unit to affect processing logic as "agents" interactions with the tag units. Each agent interacts with AIDC devices (e.g., read or write data) through drivers/adaptors for readers of AIDC devices. Each agent may be associated with one or more tag reader. A local persistent data storage mechanism may be associated to an agent to maintain and record data access and processing history and audit trail.

The peer-relationship between agents that defines permissions and mode of interactions between agents are defined by an agent profile. For example, peer relationship may be established between agents that may read/write the same type of tag, or agents covering the same or nearby location, or agents managing the same supply chain with compatible permissions. An agent advertises its profile to the network for other agents to maintain in their agent registries when it first enters the network, when its profile changes, or periodically to update state if the agent registries have a time out period. An agent's agent registry contains the list of all known valid agents in the network that the agent is aware of. An agent may on demand query for peer agents that satisfy a relationship against their profiles. This may allow agents and the services provided by them to be automatically discovered and seamlessly "plugged" into the network of agents. At the same time, the ad-hoc query based peer discovery mechanism may allow for the creation of dynamic relationships, rather than only stable hierarchical relationships.

In the exemplary embodiment, each agent includes an interface that allows users to see all tags that have been scanned or wrote as well as the type of tag, its profile, the scan time, and status of the scan. The interface may allow users to drill down to look at the attributes of tags read or wrote. A profile of agents may include attributes such as the storage capacities of tags supported by readers associated with it. Each agent supports an interface for the profile to be administered by users.

Also in the exemplary embodiment, each agent supports configurable and composible filtering logic to be applied to events (both incoming requests to update devices and events driven by tag access as readers poll the environment for tags). This primarily serves to reduce the amount network traffic introduced into the network by filtering irrelevant events within the agent when possible, and push computing logic to the agents in order to distribute system load and improve overall system scalablity. An example of a filter logic component is one which checks if a tag's temperature attribute is within its defined validity threshold; it stops the continued processing of the data if it is, but sends out an alert if it isn't. The business logic used to process events is dependent on the corresponding tag.

In the exemplary embodiment, the agents provide a programmable framework, e.g., an Application Programming Interface (API), for users of the system to implement their behavior, policies, and events at the initial point of data collection (e.g., scanning of a tag unit). The API may include programmable units of logic that are implemented as modular units. The programmable units are attached together to form a workflow (decision tree) called a flow. The API may allow for implementation of programmable handler units that decide which flow (decision tree) to execute. For example, programmable handler units may select a flow based upon the tag id, the type of the tag, the sender of the tag, and/or a parsed data field contained within the tags buffer. Also, the API may allow for configurable flows that execute units of software known as modules or switches. The modules or switches may be executed in sequential order. Switches may provide the option of selecting the next unit of software to execute based upon a programmed condition. Additionally, the API may allow for modules to be implemented using various internal APIs. Internal APIs may provide the ability to receive stored tag data elements by name, use locally stored database information, call peer servers stored databases, check the security validation of the tag, check whether a tag has been processed by a peer agent, secure the tag for an outbound client, and contact various outside systems for other information.

Figure 2:
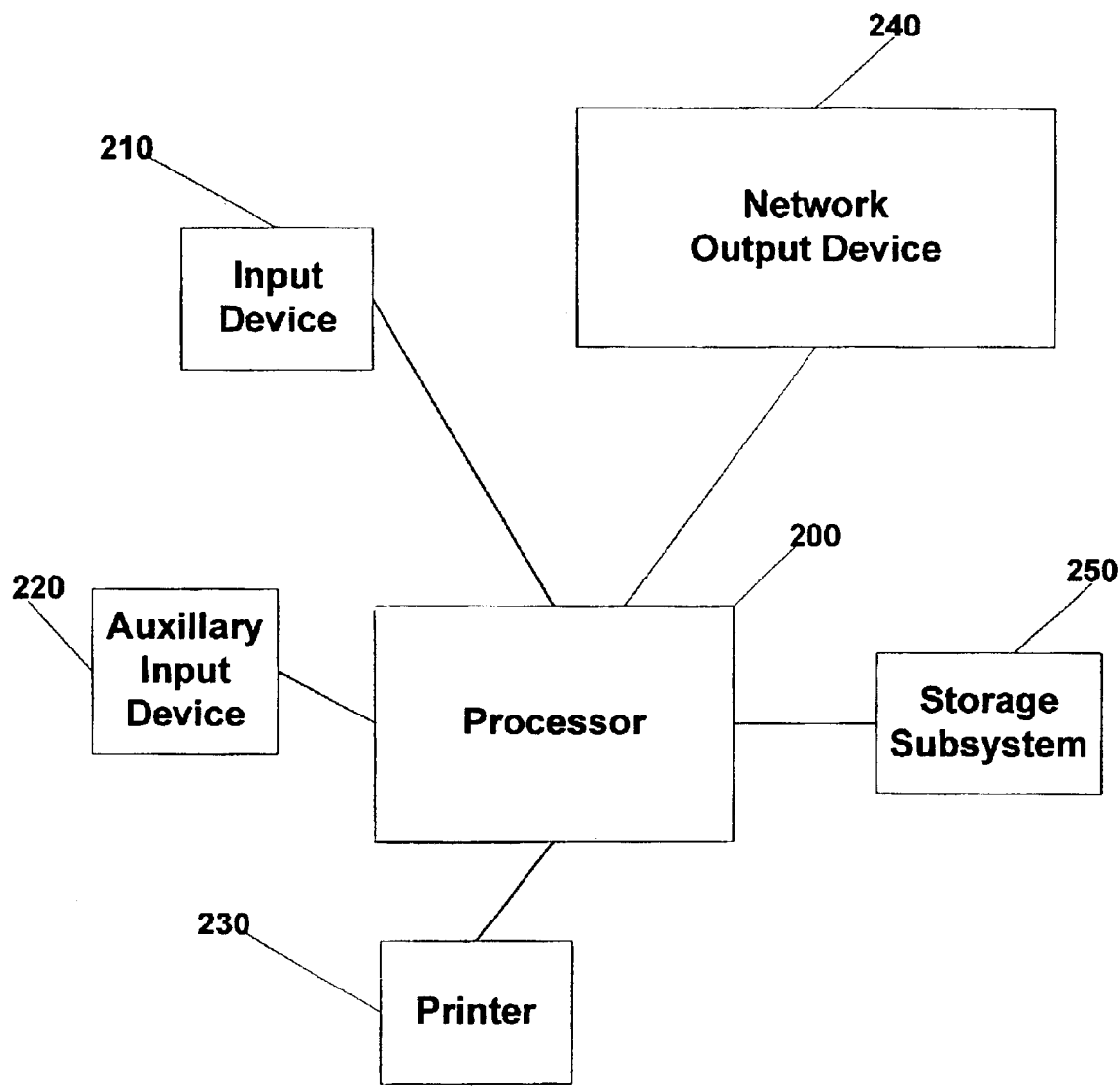
FIG. 2 shows an exemplary system according to the present invention.

FIG. 2 shows an exemplary system according to the present invention. The system is configured to execute the method described above in reference to FIG. 1. The system may be a single physical unit, or may include multiple subunits connected by networks or other communication devices.

The system may include a processor 200. The processor 200 may be configured to control the operation of the system, to process received inputs, generate outputs, and control the other components of the system. The processor 200 may be provided as a microprocessor, a single board computer, or other combination of hardware, firmware, and software components. The processor 200 may contain, or have access to, software implementing the data described previously. A disk, memory, CD-ROM, flash memory, or other computer-readable storing medium may contain a sequence of instructions which may be executed to control the method described above.

The system may include an input device 210. The input device 210 may be a scanner, a device configured to read RFID tags, or a computing arrangement. The processor 200 may be in communication with the input device 210, e.g., by a direct wired connection or a wireless connection, over a bus, or over a network. The data read from the RFID tags may be transmitted to the processor 200 by the input device 210.

The system may also include an auxiliary input device 220. The auxiliary input device 220 may be a keyboard, keypad, a computing arrangement, or other device that allows inputs such as alphanumeric values, to be received by the auxiliary input device 220 from an operator or attendant. The auxiliary input device 220 may be in communication with the processor 200, e.g., connected by a bus or network.

The system may also include a printer 230. The processor 200 may be in communication with the printer 230, e.g., over a bus or network. The printer 230 may be configured to print data that was determined by scanning the RFID tag.

The system may also include a network output device 240. The network output device 240 may be in communication with the processor 200. The network output device 240 may provide an interface between a RFID tag and a network, a private wide area network, a phone line connection, the internet, etc. The network output device 240 may be configured to transmit information from the system and to receive information for outside the system, e.g., from a central control server. The information the network output device 240 is configured to transmit may include the tags scanned, tags wrote, tag type, scan time, tap profile and status of scan. The system may also include a storage subsystem 250. The storage subsystem may include RAM, ROM, magnetic disks, flash memory, optical memory, or other forms of hardware storage. The storage subsystem 250 may also including various forms of storage software, e.g., a relational database, object-oriented data structures, etc. The processor 200 may be in communication with the storage subsystem 250, e.g., over a bus or network. The storage subsystem 250 may also be contained in the processor. The storage subsystem 250 may be used to store the data on the RFID tags.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A method for tracking items, comprising:
   (a) storing data on a tag unit, the data including information regarding tracking of an item and the tag unit being at least one of readable and writeable, the tag unit monitoring and storing a status of the item;
   (b) attaching the tag unit to the item;
   (c) sending the item to a destination;
   (d) scanning the tag unit when the item has arrived at a destination;
   (e) updating the data on the tag unit as a function of scanning, the data being updated when the tag unit is scanned at the destination; and
   (f) validating the data on the tag unit;
   wherein a set of tag units forms a database for tracking items.

2. The method of claim 1, wherein the tag unit is in communication with a locationing system in order to provide a location data of the tag unit and the item.

3. The method of claim 1, wherein the tag unit is configured for at least one of environmental sensing and other sensing.

4. A computer-readable storing medium storing a set of instructions, the set of instructions capable of being executed by a processor to implement a method for tracking items, the set of instructions performing the steps of:
   (a) storing data on a tag unit, the data including information regarding tracking of an item and the tag unit being at least one of readable and writeable, the tag unit monitoring and storing a status of the item;
   (b) attaching the tag unit to the item;
   (c) sending the item to a destination;

(d) scanning the tag unit when the item has arrived at a destination;

(e) updating the data on the tag unit as a function of scanning, the data being updated when the tag unit is scanned at the destination; and (f) validating the data on the tag unit;

wherein a set of tag units forms a database for tracking items.

5. The computer-readable storing medium of claim 4, wherein the tag unit is in communication with a locationing system in order to provide a location data of the tag unit and the item.

6. The computer-readable storing medium of claim 4, wherein the tag unit is configured for at least one of environmental sensing and other sensing.

7. A system comprising:

a processor;

at least one computing arrangement configured to communicate with the processor via a communications network; and a computer-readable storing medium storing a set of instructions, the set of instructions capable of being executed by the processor to implement a method for tracking items, the set of instructions performing the steps of:

(a) storing data on a tag unit, the data including information regarding tracking of an item and the tag unit being at least one of readable and writeable, the tag unit monitoring and storing a status of the item;

(b) attaching the tag unit to the item;

(c) sending the item to a destination;

(d) scanning the tag unit when the item has arrived at a destination;

(e) updating the data on the tag unit as a function of scanning, the data being updated when the tag unit is scanned at the destination; and (f) validating the data on the tag unit;

wherein a set of tag units forms a database for tracking items.

8. The system of claim 7, wherein the tag unit is in communication with a locationing system in order to provide a location data of the tag unit and the item.

9. The system of claim 7, wherein the tag unit is configured for at least one of environmental sensing and other sensing.

10. The method of claim 1, wherein the set of tag units forms a distributed database for tracking items.

11. The method of claim 1, wherein the data includes a time of scanning.

12. The method of claim 1, wherein the tracking information includes at least one of a destination, a weight, a bill of lading, and a delivery time.

13. The method of claim 1, further comprising:

(g) providing authenticated access to the data via at least one edge interaction agent.

14. The method of claim 13, wherein the at least one edge interaction agent includes a software-based application.

15. The method of claim 13, wherein the at least one edge interaction agent forms a peer-to-peer network.

16. The method of claim 15, wherein the set of tag units form a non-centralized storage arrangement for the peer-to-peer network.

* * * * *